United States Patent
Yu et al.

(10) Patent No.: US 9,654,192 B2
(45) Date of Patent: May 16, 2017

(54) APPARATUS AND METHOD FOR CHANNEL FEEDBACK IN MULTIPLE INPUT MULTIPLE OUTPUT SYSTEM

(71) Applicants: Samsung Electronics Co., Ltd., Gyeonggi-do (KR); Industry-Academic Cooperation Foundation, Yonsei University, Seoul (KR)

(72) Inventors: Hyoung-Youl Yu, Seoul (KR); Chan-Byoung Chae, Gyeonggi-do (KR); Yeon-Geun Lim, Gyeongsangbuk-do (KR); Young-Woo Kwak, Gyeonggi-do (KR); Hyo-Jin Lee, Gyeonggi-do (KR); Hyoung-Ju Ji, Seoul (KR); Youn-Sun Kim, Gyeonggi-do (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 0 days.

(21) Appl. No.: 14/626,519

(22) Filed: Feb. 19, 2015

(65) Prior Publication Data
US 2015/0236765 A1    Aug. 20, 2015

(30) Foreign Application Priority Data
Feb. 19, 2014    (KR) .................. 10-2014-0019353

(51) Int. Cl.
*H04B 7/04*    (2017.01)
*H04B 7/06*    (2006.01)
(Continued)

(52) U.S. Cl.
CPC ......... *H04B 7/0452* (2013.01); *H04B 7/0417* (2013.01); *H04B 7/0456* (2013.01);
(Continued)

(58) Field of Classification Search
CPC .. H04B 7/0417; H04B 7/0456; H04B 7/0478; H04B 7/0482; H04B 7/0619;
(Continued)

(56) References Cited

U.S. PATENT DOCUMENTS 7,120,395 B2 * 10/2006 Tong ..................... H04B 7/061
                                                                375/349
8,279,960 B2 * 10/2012 Kim ..................... H04B 7/0452
                                                                375/267

(Continued)

*Primary Examiner* — Betsy Deppe
(74) *Attorney, Agent, or Firm* — The Farrell Law Firm, P.C.

(57) ABSTRACT

A method and apparatus for a channel feedback by a signal transmitting device in a Multiple Input Multiple Output (MIMO) system are provided. The method includes transmitting a pilot in which a compression rate is reflected to a signal receiving device; receiving channel related information on a compressed channel from the signal receiving device; and performing a precoding based on the channel related information. The apparatus includes a transmitting unit configured to transmit a pilot to which a compression rate is reflected to a signal receiving device; a receiving unit configured to receive channel related information on a compressed channel from the signal receiving device; and a precoding unit configured to perform a precoding based on the channel related information.

8 Claims, 9 Drawing Sheets

(51) Int. Cl.
*H04B 7/0452* (2017.01)
*H04B 7/0456* (2017.01)
*H04B 7/0417* (2017.01)

(52) U.S. Cl.
CPC ......... *H04B 7/0469* (2013.01); *H04B 7/0478* (2013.01); *H04B 7/0639* (2013.01); *H04B 7/0663* (2013.01)

(58) Field of Classification Search
CPC .... H04B 7/0626; H04B 7/063; H04B 7/0632; H04B 7/0636; H04B 7/0639; H04B 7/0421; H04B 7/0452; H04B 7/0663
USPC ........................................................ 375/267
See application file for complete search history.

(56) References Cited

U.S. PATENT DOCUMENTS

| | | | |
|---|---|---|---|
| 9,276,653 B2* | 3/2016 | Bultan | H04B 7/0456 |
| 2012/0288022 A1* | 11/2012 | Guey | H04B 7/0691 375/267 |
| 2013/0243046 A1 | 9/2013 | Vetterli et al. | |

* cited by examiner $$\begin{bmatrix} 0.5377 & -1.3499 & 0.6715 & 0.8884 & -0.1022 & -0.8637 & -1.0891 & -0.6156 & 1.4193 & -1.1480 \\ 1.8339 & 3.0349 & -1.2075 & -1.1471 & -0.2414 & 0.0774 & 0.0326 & 0.7481 & 0.2916 & 0.1049 \\ -2.2588 & 0.7254 & 0.7172 & -1.0689 & 0.3192 & -1.2141 & 0.5525 & -0.1924 & 0.1978 & 0.7223 \\ 0.8622 & -0.0631 & 1.6302 & -0.8095 & 0.3129 & -1.1135 & 1.1006 & 0.8886 & 1.5877 & 2.5855 \\ 0.3188 & 0.7147 & 0.4889 & -2.9443 & -0.8649 & -0.0068 & 1.5442 & -0.7648 & -0.8045 & -0.6669 \\ -1.3077 & -0.2050 & 1.0347 & 1.4384 & -0.0301 & 1.5326 & 0.0859 & -1.4023 & 0.6966 & 0.1873 \\ -0.4336 & -0.1241 & 0.7269 & 0.3252 & -0.1649 & -0.7697 & -1.4916 & -1.4224 & 0.8351 & 0.0825 \\ 0.3426 & 1.4897 & -0.3034 & -0.7549 & 0.6277 & 0.3714 & -0.7423 & 0.4882 & -0.2437 & -1.9300 \\ 3.5784 & 1.4090 & 0.2939 & 1.3703 & 1.0933 & -0.2256 & -1.0616 & -0.1774 & 0.2157 & -0.4390 \\ 2.7694 & 1.4172 & -0.7873 & -1.7115 & 1.1093 & 1.1174 & 2.3505 & -0.1961 & -1.1658 & -1.7947 \end{bmatrix}$$

APPARATUS AND METHOD FOR CHANNEL FEEDBACK IN MULTIPLE INPUT MULTIPLE OUTPUT SYSTEM

PRIORITY

This application claims priority under 35 U.S.C. §119(a) to a Korean Patent Application filed on Feb. 19, 2014 in the Korean Intellectual Property Office and assigned Serial No. 10-2014-0019353, the entire contents of which are incorporated herein by reference.

BACKGROUND

1. Field of the Invention

The present invention relates to an apparatus and a method for a channel feedback in a Multiple Input Multiple Output (MIMO) system, and more particularly, to an apparatus and a method for a channel feedback in a MIMO system, which reduces an overhead of a channel feedback and an amount of a pilot in a multiple antenna system of which a spatial correlation is comparatively high.

2. Description of the Related Art

To meet the demand for wireless data traffic which has increased since deployment of 4G communication systems, efforts have been made to develop an improved 5G or pre-5G communication system. Therefore, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission distance, beamforming, massive Multiple-Input Multiple-Output (MIMO), Full Dimensional MIMO (FD-MIMO), array antenna, analog beamforming, and large scale antenna techniques are discussed in 5G communication systems.

In addition, in 5G communication systems, development for system network improvement is under way based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like.

In a 5G system, Hybrid Frequency Shift Keying (FSK), Quadrature Amplitude Modulation (QAM), Feher's QAM (FQAM) and Sliding Window Superposition Coding (SWSC), as an Advanced Coding Modulation (ACM), and Filter Bank Multi Carrier (FBMC), Non-Orthogonal Multiple Access (NOMA), Sparse Code Multiple Access (SCMA), and Low-Density Parity-Check (LDPC) coding, as an advanced access technology, have been developed.

Recently, in order to transmit high quality data at a high speed in a wireless communication environment, research on a Multiple Input Multiple Output (MIMO) system which uses resources of a spatial area is actively being performed. Specially, interest in a massive MIMO technique which uses several tens to several hundreds of antennas in a base station is increasing.

The massive MIMO system may install a plurality of antennas in, for example, a Base Station (BS), and may relatively easily resolve various problems such as fast fading and inter-user interference by using only a simple linear precoder. In addition, the massive MIMO system may obtain a relatively high data rate. Advantages of the massive MIMO system include the number of antennas supported by the BS is not limited, and it is based on an assumption that the BS is aware of all channel information for each antenna supported by the BS.

The MIMO system may be classified into a Single-User MIMO (SU-MIMO) method in which a user uses all of the identical time and space resources and a Multi-User MIMO (MU-MIMO) method in which a plurality of users share all of the identical time and space resources.

The SU-MIMO method has been discussed in several standards such as Institute of Electrical and Electronics Engineers (IEEE) 802.16, because a method for transmitting a principal singular vector of a channel such as a Grassmannian codebook by quantizing the principal singular vector of the channel for a channel feedback has been developed.

Since cooperation between users is almost impossible using the MU-MIMO method, interference between receivers (i.e., users) should be removed or relieved by using only a precoder. In order to generate a precoder supporting multiple users in a BS, each receiver should feed channel information back to the BS.

A feedback method in the MU-MIMO system includes an orthogonal beamforming method and a vector quantization method.

The orthogonal beamforming method is a method in which a receiver selects a Precoding Matrix Index (PMI) and feeds the PMI back to a BS.

The vector quantization method is a method in which a receiver selects a Channel Direction Index (CDI) and feeds the CDI back to a BS.

The lower the number of receivers which can simultaneously support the orthogonal beamforming the more advantageous, and thus a method for feeding back a PMI to the BS has been described.

SUMMARY

The present invention has been made to address the above-mentioned problems and disadvantages, and to provide at least the advantages described below. Accordingly, an aspect of the present invention provides an apparatus and a method for a channel feedback in a Multiple Input Multiple Output (MIMO) system, which reduces an overhead of a channel feedback and an amount of a pilot in a multiple antenna system of which a spatial correlation is comparatively high.

Another aspect of the present invention provides an apparatus and a method for channel feedback in a MIMO system, which reduce a calculation amount for searching for a feedback index.

Another aspect of the present invention provides an apparatus and a method for a channel feedback in a MIMO system, which effectively compress a high dimensional channel matrix caused by the presence of many antennas to feed compressed channel codebook back to a receiver and reduce an amount of a pilot.

Another aspect of the present invention provides an apparatus and a method for a channel feedback in a MIMO system, which maximizes performance of a single/multiple user massive MIMO system.

According to an aspect of the present invention, a method for channel feedback by a signal transmitting device in a MIMO system is provided. The method includes transmitting a pilot in which a compression rate is reflected to a signal receiving device, receiving channel related information on a compressed channel from the signal receiving device, and performing a precoding based on the channel related information.

According to another aspect of the present invention, an apparatus for a channel feedback by a signal transmitting device in a MIMO system is provided. The apparatus includes a transmitting unit configured to transmit a pilot to which a compression rate is reflected to a signal receiving device, a receiving unit configured to receive channel related information on a compressed channel from the signal receiving device, and a precoding unit configured to perform a precoding based on the channel related information.

According to another aspect of the present invention, a method for a channel feedback by a signal receiving device in a MIMO system is provided. The method includes receiving a pilot to which a compression rate is reflected from a signal transmitting device, transmitting channel related information on a compressed channel to the signal transmitting device, and receiving data precoded based on the channel related information.

According to another aspect of the present invention, an apparatus for a channel feedback by a signal receiving device in a MIMO system is provided. The apparatus includes a receiving unit configured to receive a pilot to which a compression rate is reflected from a signal transmitting device, and a transmitting unit configured to transmit channel related information on a compressed channel to the signal transmitting device, wherein the receiving unit receives data precoded based on the channel related information.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
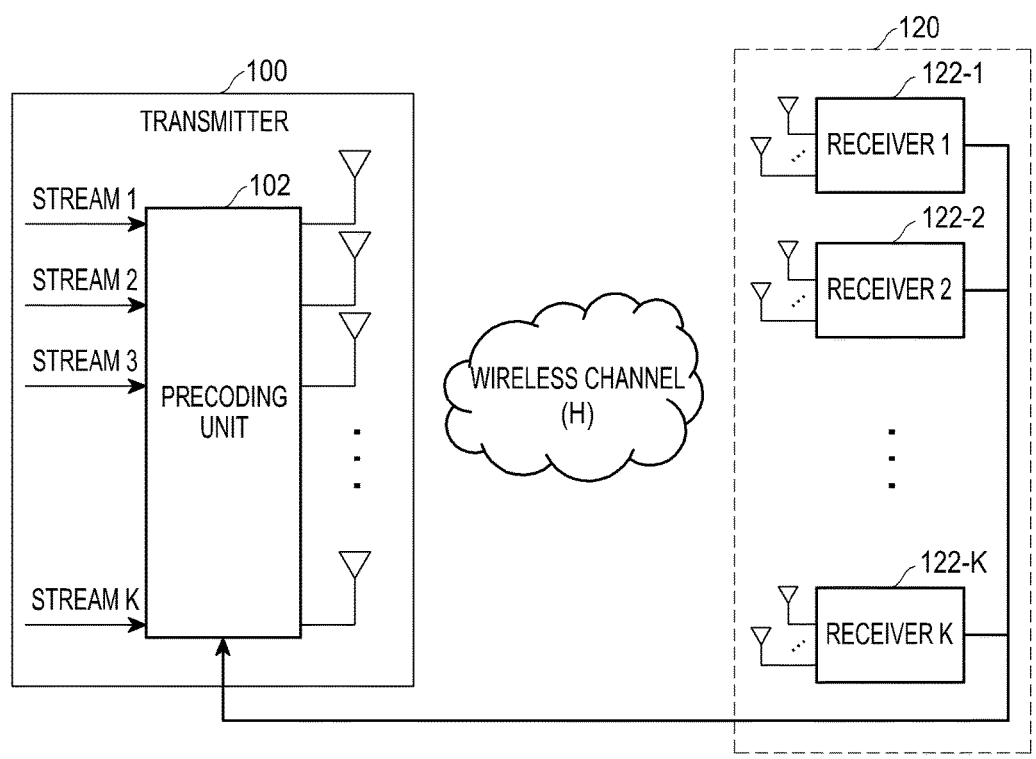
FIG. 1 is a block diagram illustrating a method for feedback in a MIMO system.

Hereinafter, embodiments of the present invention are described in detail with reference to the accompanying drawings. Same elements are designated by the same reference numerals although they are shown in different drawings. Further, a detailed description of a known function and configuration which may make the subject matter of the present invention unclear is omitted.

Further, terms or words used in the description and claims below should not be interpreted as only general or dictionary meanings, but should be interpreted as meanings and concepts satisfying the technical scope and spirit of the present invention.

A channel feedback technique is mainly developed in a finite antenna system environment with a few antennas. In a massive MIMO system, since the number of receivers which can simultaneously be supported is increased, a vector quantization method in which a CDI is fed back is more advantageous as compared to an orthogonal beamforming method in which a PMI is fed back. Information fed back in a channel feedback technique may include, for example, a Channel Quality Indicator, a precoder index, a rank number and the like based on attributes of a wireless channel measured by a terminal, as well as the PMI and the CDI. The precoder is information including a weight multiplied by a plurality of antennas. The rank number indicates the number of data streams transmitted via the plurality of antennas.

In addition, a calculation amount for searching for an index of both the orthogonal beamforming method and the vector quantization method has been increased in a massive MIMO system. In addition, the related art has designed in an environment in which spatial correlation of a channel is comparatively low. However, in a case of a massive MIMO system, since several tens to several hundreds of antennas may be installed in a limited space, a spatial correlation is increased as compared to an existing system. Therefore, an existing method for channel feedback is not suitable for a massive MIMO system in which spatial correlation is high.

In a massive MIMO system, an amount of a pilot is increased according to the number of antennas. Time and space resources are limited in the massive MIMO system. Therefore, when the amount of the pilot increases, resources for transmitting data are less. Thus, the original purpose of a MIMO, which is to transmit data at a high speed, is reduced.

A method and an apparatus for a feedback in a massive MIMO system in which there is a spatial correlation of a channel, which is proposed in the present invention, are described below in detail via embodiments of the present invention.

A first embodiment of the present invention is a method in which a receiver selects one among codebooks compressed in advance, when a transmitter (i.e., a signal transmitting device, and e.g., a base station and the like) having M antennas feeds a channel compression rate ($0<\eta<1$) forward to the receiver (i.e., a signal receiving apparatus, and e.g., a mobile terminal, a user and the like).

A codebook according to a compression rate is generated in advance by multiplying a measurement matrix and the codebook. In this case, the measurement matrix uses N (e.g. $N=\eta M$) row vectors according to a compression rate from a total of M row vectors in a predetermined measurement matrix and is a measurement matrix in which a dimension is reduced. When the receiver receives the compression rate in the feed forward method, the receiver selects the codebook corresponding to the compression rate, and compresses a channel vector by multiplying the measurement matrix in which the dimension is reduced and the channel vector. When the receiver feeds a CDI of the compressed channel back to the transmitter, since there is no inverse matrix of the measurement matrix, the transmitter recovers the existing channel from the compressed channel using a compression sensing method.

A second embodiment of the present invention is an example in which a method of generating a codebook is different from that of the first embodiment in operations in the same manner as the first embodiment. In the first embodiment of the present invention, the corresponding codebook matrix is selected according to a compression rate. However, in the second embodiment of the present invention, one codebook including M row vectors is generated in advance by multiplying a codebook and a measurement matrix including the M row vectors. When the receiver receives the compression rate in the feed forward method, the receiver uses the codebook in which a dimension is reduced. In this case, the codebook is formed of N row vectors except for M-N row vectors from M row vectors. Since the compressed codebook according to the first embodiment of the present invention and the codebook in which the dimension is reduced according to the second embodiment of the present invention are the same codebook, the remaining processes of the second embodiment are the same as those of the first second embodiment.

A third embodiment of the present invention is a method in which the receiver feeds a compression rate back to the transmitter to reduce an amount of a pilot of the transmitter from M to N. When the transmitter receives the compression rate in a feedback method, the transmitter uses N row vectors of a measurement matrix as the pilot. Then, the receiver has N effective channels, and the receiver feeds back a CDI using the compressed codebook or the codebook of which the dimension is reduced according to the first embodiment of the present invention or the second embodiment of the present invention. In addition, since an effective channel estimated by the receiver is a channel compressed in advance, the receiver does not have to compress the channel. The subsequent processes of the third embodiment are the same as those of the first embodiment.

FIG. 1 is a block diagram illustrating a method for feedback in a MIMO system.

The MIMO system includes a transmitter 100 and a receiver 120.

The transmitter 100 includes a precoding unit 102. When the precoding unit 102 implements the MIMO using a plurality of antennas, the precoding unit 102 performs a precoding in order to form a transmission beam adaptively according to a channel state. A precoding codebook is configured in advance between the transmitter and the receiver.

Receiver units 122-1, 122-2, ..., and 122-K of the receiver 120 feed back only a PMI or CDI of a predetermined codebook, and thus a calculation amount increases, performance improvement according to a spatial correlation and a pilot reduction effect of a massive MIMO system may not be expected. Methods for improving these parameters are the first to third embodiments of the present invention.

Figure 2:
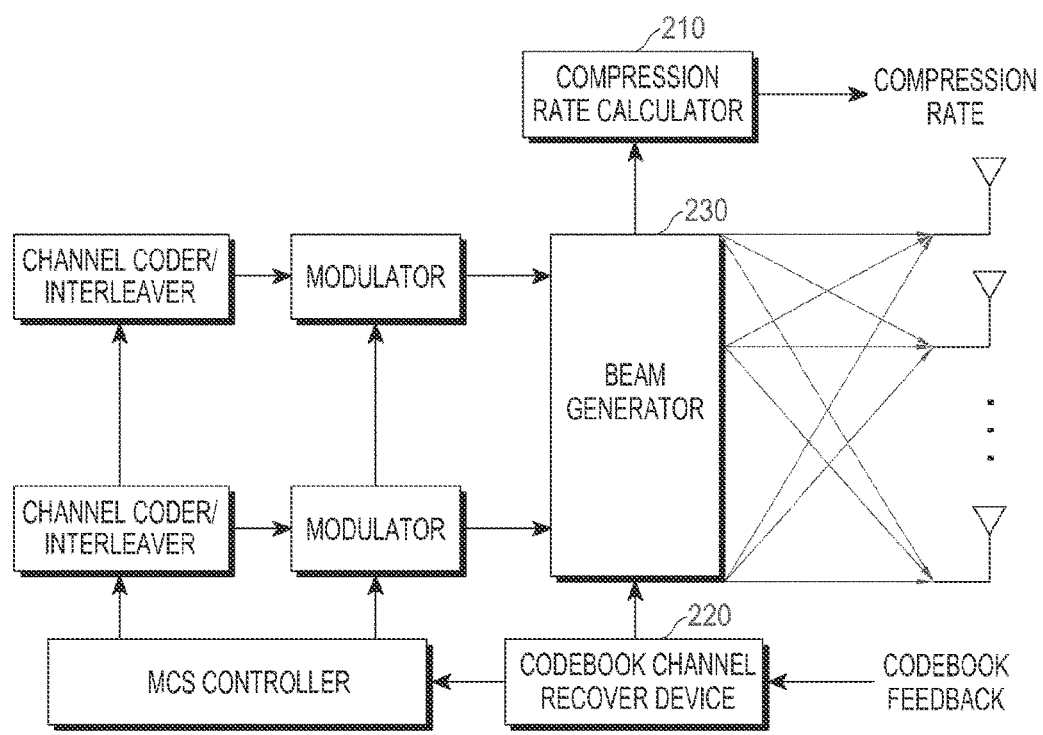
FIG. 2 is a block diagram illustrating a transmitter according to a first and a second embodiment of the present invention.

FIG. 2 is a block diagram illustrating a transmitter 200 according to the first embodiment of the present invention and the second embodiment of the present invention.

A compression rate calculator 210 of the transmitter determines a compression rate, and feeds an index of the determined compression rate forward to the receiver. The compression rate may be determined according to, for example, a channel environment. Next, when the transmitter receives a codebook feedback from the receiver, a codebook channel recover device 220 recovers a quantized channel via a Compression Sensing (CS) recovery technique. When the codebook channel recover device 220 sends channel information to a beam generator 230, the beam generator 230 generates a precoded signal and transmits data to the receiver.

Figure 3:
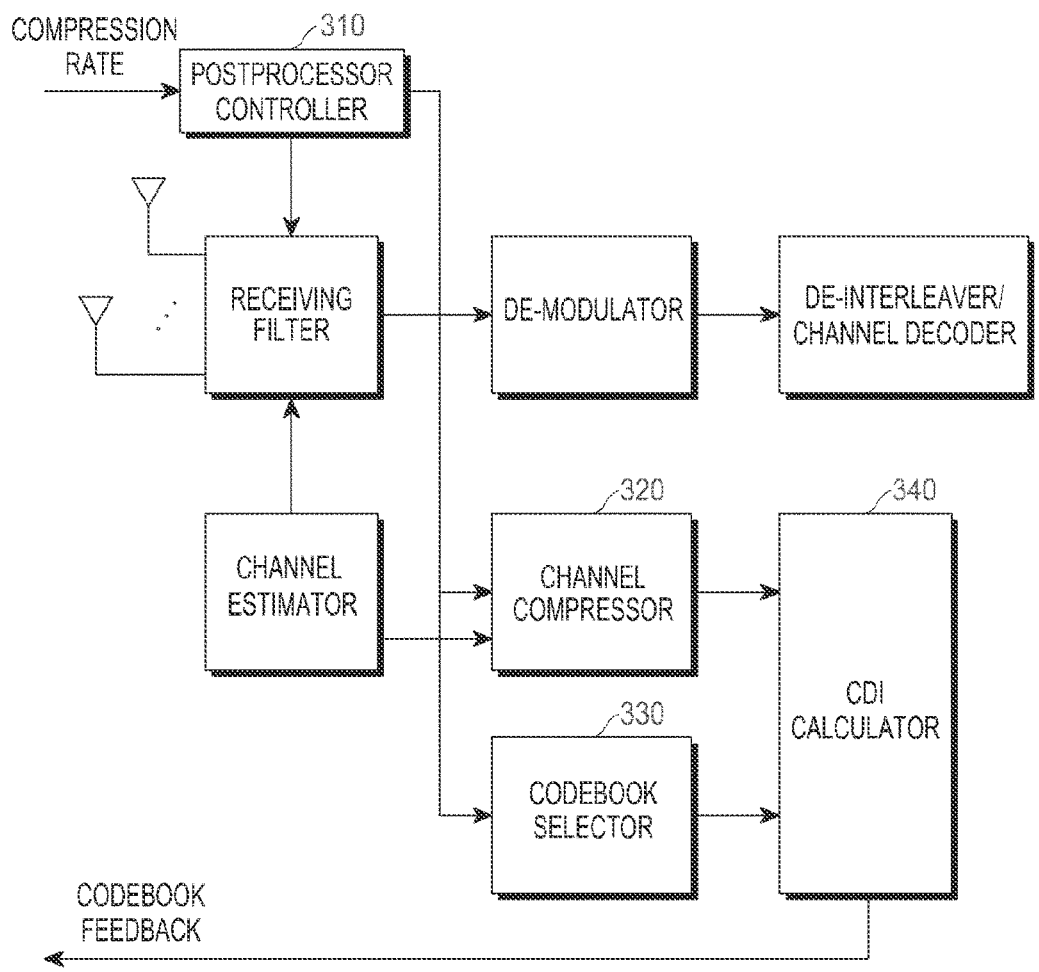
FIG. 3 is a block diagram illustrating a receiver according to the first embodiment of the present invention.

FIG. 3 is a block diagram illustrating the receiver according to the first embodiment of the present invention.

When a postprocessor controller 310 of the receiver receives the compression rate from the transmitter, the postprocessor controller 310 transfers information on the compression rate to a channel compressor 320 and a codebook selector 330. The channel compressor 320 multiplies a measurement matrix in which a dimension is reduced by a channel (e.g. h) to compress the channel. The compressed channel may be determined by Equation (1) below.

$$s = \tilde{\Phi}^{\eta} h. \qquad (1)$$

In Equation (1), $\tilde{\Phi}^{\eta}$ indicates the measurement matrix in which the dimension is reduced, h indicates an original channel, and s indicates the compressed channel.

The measurement matrix $\tilde{\Phi}^{\eta}$ of which the dimension is reduced is a sub-set of the measurement matrix $\Phi$, and is obtained by Equation (2) below.

$$\Phi = \begin{bmatrix} \phi_1 \\ \vdots \\ \phi_M \end{bmatrix} \qquad (2)$$

$$= \begin{bmatrix} \tilde{\Phi}^{\eta} \\ \phi_{N+1} \\ \vdots \\ \phi_M \end{bmatrix}.$$

$\phi_M$ indicates an m-th row vector of the measurement matrix. When a codebook $F^{(\eta)} = \tilde{\Phi}^{\eta} W$ according to the compression rate is generated in advance from the existing codebook W, the codebook selector 330 selects a codebook corresponding to the compression rate among the codebooks $[F^{(\eta=0.1)} F^{(\eta=0.2)} \ldots ]$.

Figure 4:
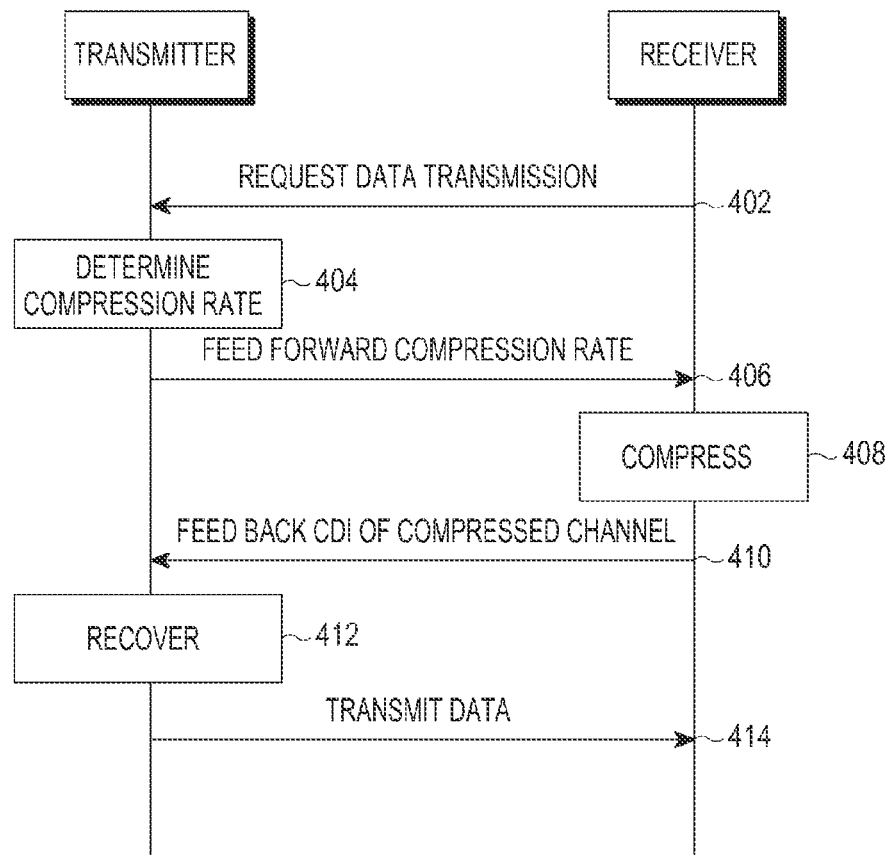
FIG. 4 is a flowchart illustrating operations of a transmitter and a receiver according to the first and second embodiments of the present invention.

CDI calculator 340 searches for an index based on the channel and the codebook calculated from the channel compressor 320 and the codebook selector 330, and feeds the codebook back to the receiver. FIG. 4 is a flowchart illustrating operations of a transmitter and a receiver according to the first and second embodiments of the present invention. In step 402, the receiver requests a data transmission from the transmitter. Next, in step 404, the transmitter determines the compression rate (0<η<1) according to the request. In step 406, the transmitter feeds the compression rate forward to the receiver. In step 408, the receiver compresses the channel according to the compression rate. A channel compression process is a generation of the codebook based on the compression rate.

A process of generating the codebook in the first embodiment of the present invention includes generating of the compressed codebook by multiplying the codebook and the measurement matrix in which the dimension is reduced. In this case, the measurement matrix has N row vectors. A process of generating the codebook in the second embodiment of the present invention includes selecting of the sub-set corresponding to the compression rate after generating the codebook in advance by multiplying the codebook and the measurement matrix formed of M row vectors.

In step 410, the receiver feeds the CDI information (i.e., the codebook) of the compressed channel back to the transmitter. In step 412, the transmitter recovers the channel based on the CDI information.

Next, in step 414, the transmitter generates the precoder based on the CDI information and transmits the data to the receiver.

Figure 5:
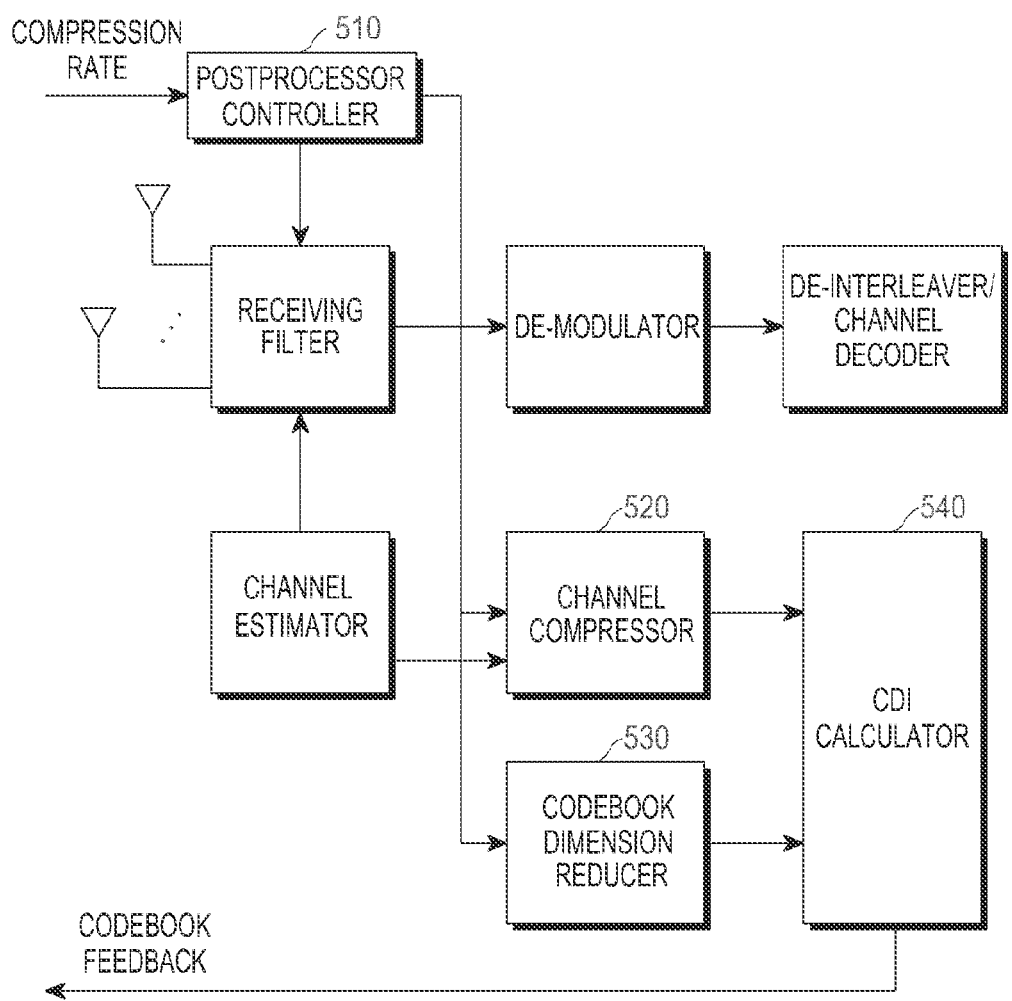
FIG. 5 is a block diagram illustrating a receiver according to the second embodiment of the present invention.

FIG. 5 is a block diagram illustrating the receiver according to the second embodiment of the present invention.

Functions of postprocessor controller 510, a channel compressor 520, and a CDI calculator 540 are the same as those of the postprocessor controller 310, the channel compressor 320 and the CDI calculator 340 of FIG. 3.

A codebook dimension reducer 530 of FIG. 5 generates a sub-set $\tilde{\Phi}\tilde{\eta}$ of a codebook F=ΦW generated in advance according to the second embodiment of the present invention, and F is generated by Equation (3) below. The subsequent operations are the same as those of the first embodiment of the present invention.

$$F = \begin{bmatrix} f_1 \\ \vdots \\ f_M \end{bmatrix} \quad (3)$$

$$= \begin{bmatrix} \widetilde{F\eta} \\ f_{N+1} \\ \vdots \\ f_M \end{bmatrix}.$$

Figure 6:
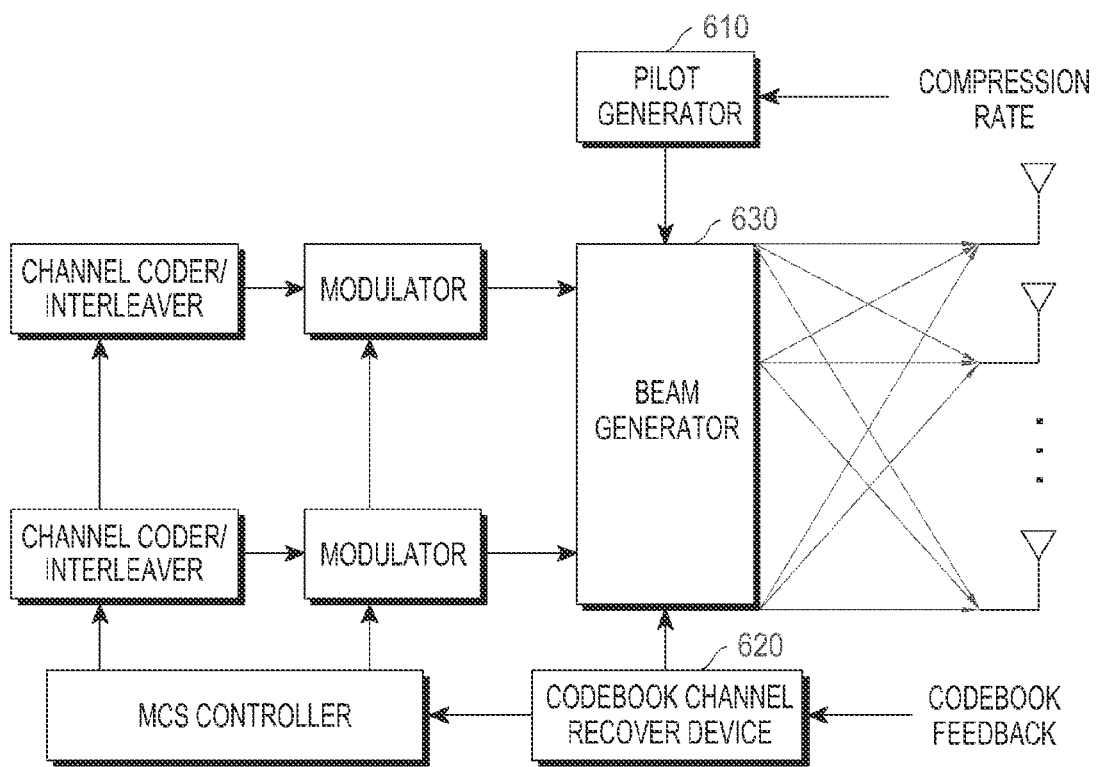
FIG. 6 is a block diagram illustrating a transmitter according to a third embodiment of the present invention.

FIG. 6 is a block diagram illustrating a transmitter according to the third embodiment of the present invention.

When a pilot generator 610 receives a compression rate from a receiver in a feedback method according to the third embodiment of the present invention, the pilot generator 610 selects N $\phi_{ms}$ as a pilot. Thus, the receiver knows N channels not M channels. The other elements of FIG. 6 are the same as those of FIG. 2. That is, when the transmitter receives a codebook feedback from the receiver, a codebook channel recover device 620 recovers a quantized channel via a CS recovery technique. When the codebook channel recover device 620 sends channel information to a beam generator 630, the beam generator 630 generates a precoded signal and transmits data to the receiver.

Figure 7:
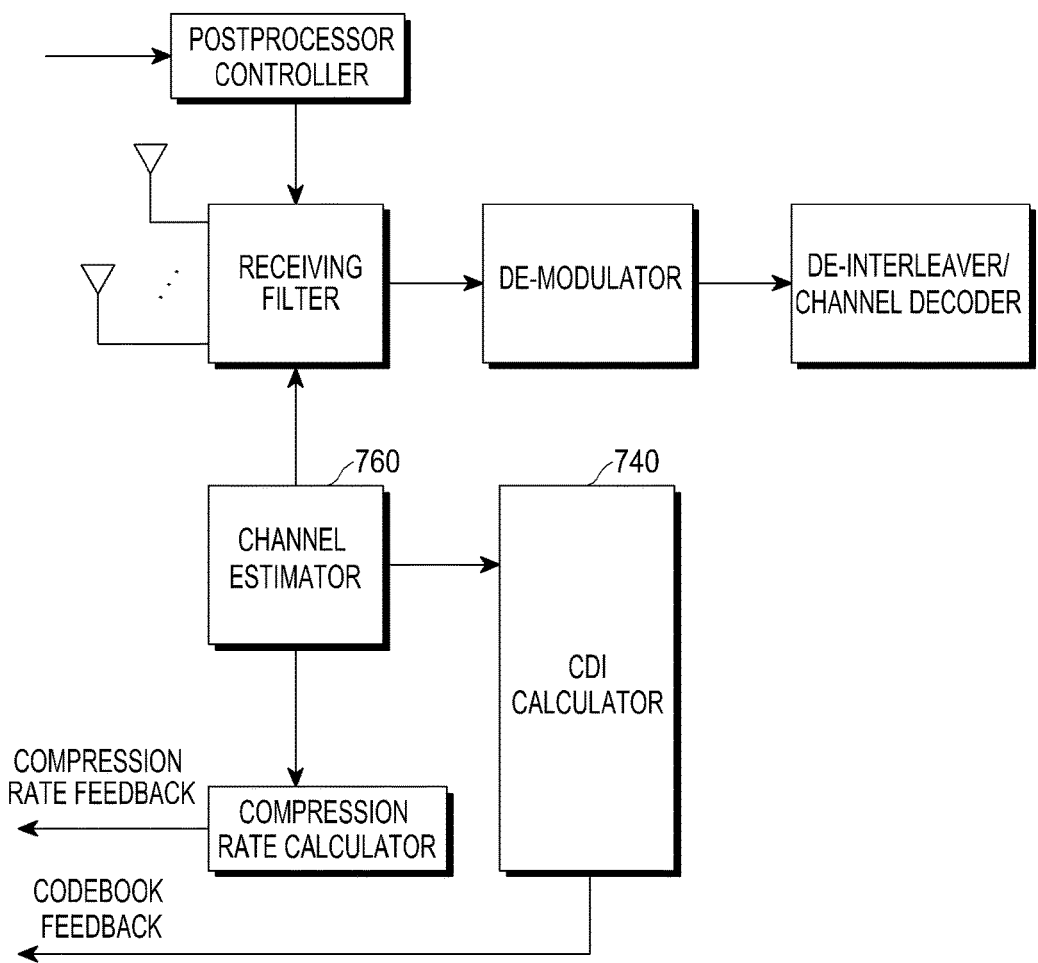
FIG. 7 is a block diagram illustrating a receiver according to the third embodiment of the present invention.

FIG. 7 is a block diagram illustrating a receiver according to the third embodiment of the present invention.

The receiver feeds a compression rate back to the transmitter before the receiver receives a pilot. Then, a feedback of the compression rate from the receiver to the transmitter is an option in the third embodiment of the present invention. Since a received effective channel is the same as the compressed channel according to the first embodiment and the second embodiment of the present invention, after a channel estimator 760 of the receiver estimates a channel, a CDI calculator 740 feeds back a CDI.

Figures 8, 9:
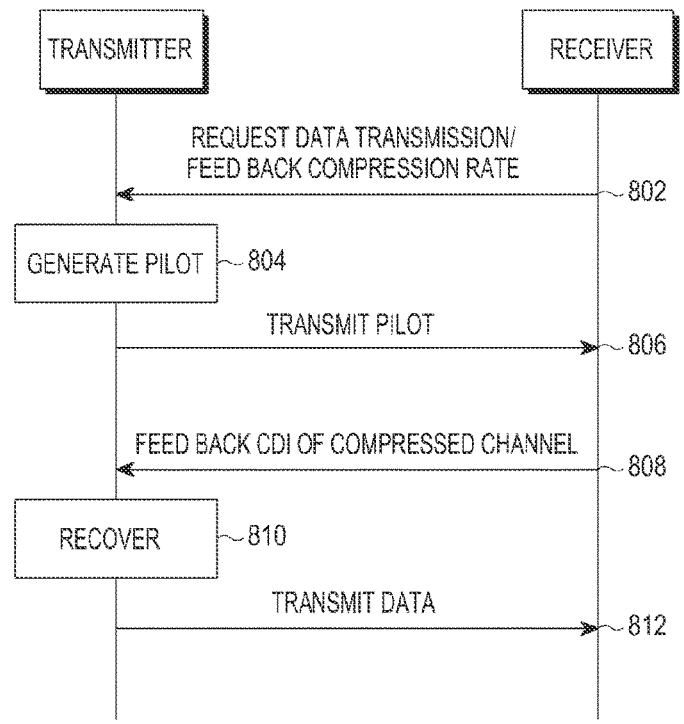
FIG. 8 is a flowchart illustrating operations of a transmitter and a receiver according to the third embodiment of the present invention.
FIG. 9 is a measurement matrix according to an embodiment of the present invention.

FIG. 8 is a flowchart illustrating operations of the transmitter and the receiver according to the third embodiment of the present invention.

In step 802, the receiver requests a data transmission from the transmitter and feeds the compression rate back to the transmitter. In this case, the feedback of the compression rate may be omitted. In step 804, the transmitter generates the pilot to which the compression rate is reflected. In step 806, the transmitter transmits the generated pilot to the receiver. In step 808, the receiver feeds the CDI information of the compressed channel to the transmitter. In step 810, the transmitter recovers the channel based on the CDI information.

Next, in step 812, the transmitter generates the precoder based on the CDI information and transmits the data to the receiver.

FIG. 9 is a measurement matrix according to an embodiment of the present invention.

FIG. 9 illustrates an example of a matrix when M is 10. In this case, M has a normal distribution of which an average is 0 and a dispersion is 1. In the same manner, measurement matrices for various distributions and various Ms may be defined.

Figure 10:
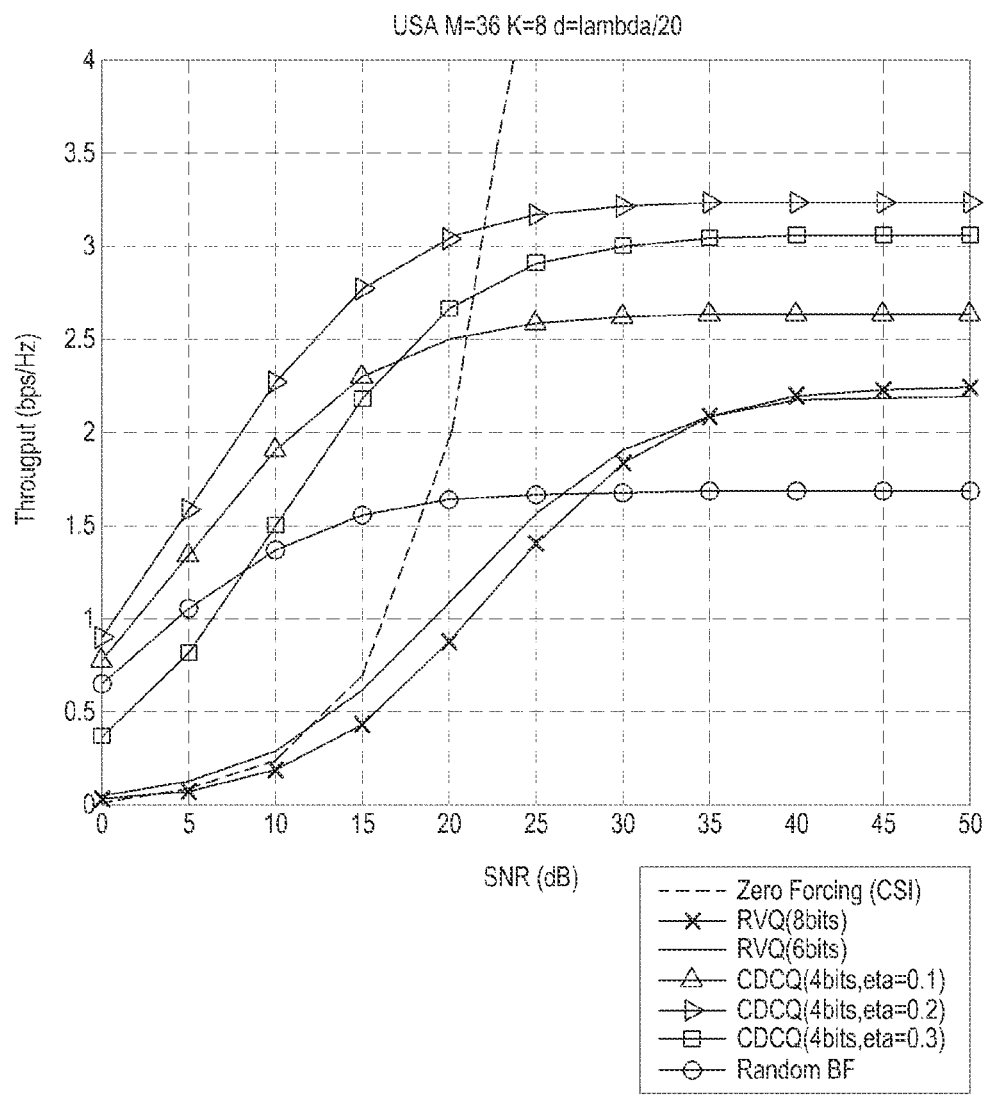
FIG. 10 is a graph illustrating a result according to an embodiment of the present invention.

FIG. 10 is a graph illustrating a result according to an embodiment of the present invention.

A very high spatial correlation in which there are 36 transmitting antennas and one receiving antenna and a distance (d) between the transmitting antennas is $$\frac{\lambda}{20}$$

is assumed. A method (e.g., a Contractible Dimension Channel Quantization (CDCQ) method) according to an embodiment of the present invention improves a performance of a total transmission rate per unit frequency compared to 6 bits and 8 bits, although the method uses a 4 bit codebook as compared to one Random Vector Quantization (RVQ). Therefore, when the method according to the present invention is used, overhead in feedback can be reduced.

In addition, an embodiment of the present invention may be applied to another channel quantization as well as the RVQ. That is, an embodiment of the present invention may generate a CS based codebook by multiplying a measurement matrix and the codebook. In addition, an embodiment of the present invention may be applied to a compact massive MIMO array.

An embodiment of the present invention can reduce a multiplication amount by using the CDCQ method as shown in Table 1 below. Table 1 below indicates a multiplication amount in a case of M=36. In this case, M indicates the number of antennas in the transmitter. N indicates the number of antennas compressed according to a compression rate ($\eta$) or antennas of which a dimension is reduced.

TABLE 1

| $\eta$ | N | Multiplication amount |
|---|---|---|
| 1 (RVQ) | 36 | 144 |
| 0.3 (CDCQ) | 12 | 48 |
| 0.1 (CDCQ) | 4 | 16 |

In addition, an apparatus and a method for a channel feedback in a MIMO system according to an embodiment of the present invention may be implemented in hardware, software, or a combination of hardware and software. Any such software may be stored, for example, in a volatile or non-volatile storage device such as a Read Only Memory (ROM), a memory such as a Random Access memory (RAM), a memory chip, a memory device, or a memory Integrated Circuit (IC), or a recordable optical or magnetic medium such as a Compact Disc (CD), a Digital Video Disc (DVD), a magnetic disk, or a magnetic tape, regardless of its ability to be erased or its ability to be re-recorded. A method for a channel feedback in a MIMO system according to an embodiment of the present invention may be implemented by a computer or a mobile terminal including a control unit and a memory. The memory may be an example of a non-transitory machine-readable storage medium which is suitable for storing a program or programs including instructions implementing embodiments of the present invention.

Accordingly, the present invention includes a program for a code implementing the apparatus and method described in the appended claims of the specification and a non-transitory machine (a computer or the like)-readable storage medium for storing the program. Further, the program may be electronically transferred by a predetermined medium such as a communication signal transferred via a wired or wireless connection, and the present invention appropriately includes equivalents of the program.

In addition, an apparatus for a channel feedback in a MIMO system according to an embodiment of the present invention may receive the program from a program providing device connected by wire or wirelessly connected thereto and may store the program. The program providing device may include a program that includes instructions enabling the program process device to perform a method for a channel feedback in a predetermined MIMO system, a memory that stores information and the like necessary in a method for a channel feedback in a MIMO system, a communication unit that performs a communication by wire or a wireless communication with the graphics processing apparatus, and a control unit that transmits a corresponding program to the transmitting and receiving devices by a request of the graphics processing apparatus or automatically.

While the present invention has been shown and described with reference to certain embodiments thereof, it will be understood by those skilled in the art that various changes in form and details may be made therein without departing from the scope and spirit of the present invention. Therefore, the scope of the present invention is not limited by the embodiments, but is defined by the appended claims and the equivalents thereof.

What is claimed is:

1. An operating method of a transmitter in a multiple input multiple output (MIMO) system, the method comprising:
    receiving a compression rate from a receiver;
    selecting N channels of M channels based on the compression rate, wherein M is an integer representing a number of antennas of the transmitter, and N is an integer smaller than M;
    transmitting pilot signals on the N channels to the receiver;
    receiving channel related information corresponding to each of the N channels from the receiver;
    precoding data based on the channel related information; and
    transmitting the precoded data to the receiver,
    wherein the channel related information is determined based on the N channels and a codebook corresponding to the compression rate.

2. The operating method of claim 1, wherein the channel related information is a channel direction index (CDI).

3. A transmitting apparatus in a multiple input multiple output (MIMO) system, the transmitting apparatus comprising:
    a pilot generator configured to receive a compression rate from a receiving apparatus, and select N channels of M channels based on the compression rate, wherein M is an integer representing a number of antennas of the transmitter, and N is an integer smaller than M;
    a beam generator configured to transmit pilot signals on the N channels to the receiving apparatus, precode data based on channel related information corresponding to each of the N channels, transmit the precoded data to the receiving apparatus; and
    a codebook channel recover device configured to receive the channel related information corresponding to each of the N channels from the receiving apparatus,
    wherein the channel related information is determined based on the N channels and a codebook corresponding to the compression rate.

4. The transmitting apparatus of claim 3, wherein the channel related information is a channel direction index (CDI).

5. An operating method of a receiver in a multiple input multiple output (MIMO) system, the method comprising:
    transmitting a compression rate to a transmitter;
    receiving pilot signals on N channels from the transmitter, the N channels being selected from M channels based on the compression rate, wherein M is an integer representing a number of antennas of the transmitter, and N is an integer smaller than M;
    determining channel related information corresponding to each of the N channels, based on a codebook corresponding to the compression rate, and
    transmitting the channel related information to the transmitter; and
    receiving data precoded based on the channel related information from the transmitter.

6. The operating method of claim 5, wherein the channel related information is a channel direction index (CDI).

7. A receiving apparatus in a multiple input multiple output (MIMO) system, the receiving apparatus comprising:
    a compression rate calculator configured to transmit a compression rate to a transmitting apparatus;
    a receiving filter configured to receive pilot signals on N channels from the transmitting apparatus, the N channels being selected from M channels based on the compression rate, wherein M is an integer representing a number of antennas of the transmitter, and N is an integer smaller than M; and
    a calculator configured to:
        determine channel related information corresponding to each of the N channels, based on a codebook corresponding to the compression rate, and
        transmit the channel related information to the transmitting apparatus,
    wherein the receiving filter receives data precoded based on the channel related information from the transmitting apparatus.

8. The receiving apparatus of claim 7, wherein the channel related information is a channel direction index (CDI).

* * * * *